(Model.)
E. NORTON.
MANUFACTURED SOLDER.
No. 364,663. Patented June 14, 1887.
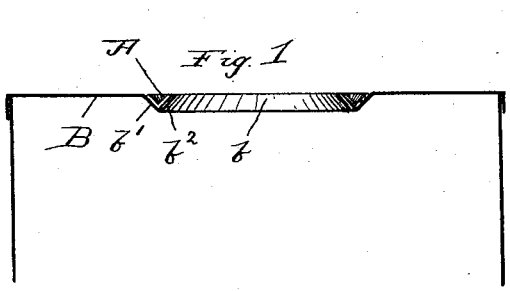
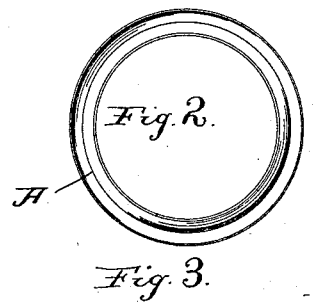
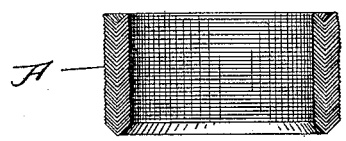
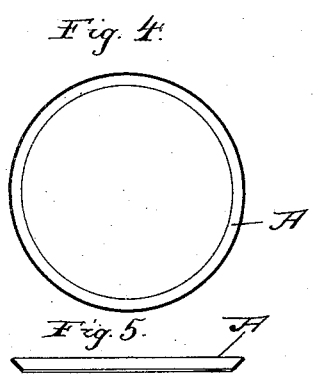
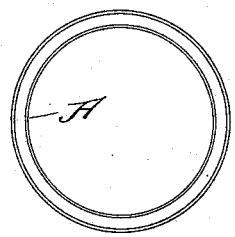
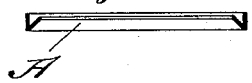
Witnesses:
Lew. E. Curtis.
H. M. Munday.
Inventor:
Edwin Norton:
By Munday, Evarts & Adcock
his Attorneys:
N. PETERS. Photo-Lithographer, Washington, D. C.

UNITED STATES PATENT OFFICE.

EDWIN NORTON, OF CHICAGO, ILLINOIS, ASSIGNOR TO HIMSELF AND OLIVER W. NORTON, OF SAME PLACE.

MANUFACTURED SOLDER.

SPECIFICATION forming part of Letters Patent No. 364,663, dated June 14, 1887.

Application filed January 17, 1887. Serial No. 224,511. (Model.)

*To all whom it may concern:*

Be it known that I, EDWIN NORTON, a citizen of the United States, residing in Chicago, in the county of Cook and State of Illinois, have invented a new and useful Improvement in Manufactured Solder for Sheet-Metal Cans, of which the following is a specification.

My invention relates to the manufacture of solder for soldering can-caps or other seams. It consists in an annulus of thin sheet-solder concentric with the can-cap or can-cap seat. In case the cap or head to be soldered should not be of a round form, the solder annulus or ring conforming thereto will also, of course, not be of a true circular form. It also consists of a thin sheet-solder annulus or ring of a V or other shape in cross-section to fit the seat of the can cap or head to be soldered. By making the annulus of a bevel or V shape conforming to one or both angles of the can-cap seat it is more readily seated or put in place, the solder is distributed with absolute uniformity over every portion of the seam, so that no time or extra heat is required to allow or cause the solder to flow along the seam, and the seam may preferably be soldered with a very much less quantity of solder than that heretofore required. The bevel or V shape of the thin sheet-solder annulus also gives the annulus the requisite stiffness or strength to preserve its shape in handling, and enables them to nest or pack closely for shipment. When a number of such solder rings are nested together, they constitute a strong ring or tube of convenient form for shipment and storage. The solder annulus is preferably made about one sixty-fourth of an inch in thickness and about three thirty-seconds of an inch in width before being beveled or grooved to conform to the seat of the can cap or head. If the solder annulus is made of a flat ring, it may be pressed into the can-cap seat or folded over the rim of the can-cap.

In the accompanying drawings, which form a part of this specification, and in which similar letters of reference indicate like parts, Figure 1 is a central vertical section of the end of the can, showing my soldering-ring in place in the can-cap seam. Fig. 2 is a plan view of the solder annulus. Fig. 3 is a central vertical section of a number of the solder rings nested together. Figs. 4 and 5 are plan and sectional views of a modification, wherein the solder ring is beveled to fit only upon the outer angle of the can-cap seam. Figs. 6 and 7 are similar views showing the ring beveled to fit only upon the inner angle of the can-cap seat. Figs. 8 and 9 are plan and sectional views of the ring, showing a modified form of groove from that shown in Figs. 1, 2, and 3.

In said drawings, A represents my thin sheet-metal solder ring or annulus.

B represents the head of the can, having the usual stud-hole and can-cap seat, $b$, at or near its center. The solder annulus A is beveled, as shown in Figs. 1, 2, and 3, to conform to both the inner and outer angles, $b'$ $b^2$, of the can-cap seat—that is to say, the annulus is of a V shape.

In Figs. 4 and 5 the annulus is beveled to fit upon only the outer wall or angle, $b'$, of the can-cap seat. In Figs. 6 and 7 it is beveled to fit upon the inner wall or angle. The thickness of the solder annulus should be just sufficient to give the requisite amount of solder to properly solder the seam. The annulus being of thin sheet or foil solder, and being already evenly distributed over the seam before the heat is applied, a comparatively small amount of heat will suffice to melt it and properly solder the seam.

In soldering caps on filled cans with my solder annulus there is no danger of scratching or injuring the contents of the can even when filled with articles liable to be injured in the old common method of soldering such caps, and as the cap may be preferably soldered with a comparatively small amount of solder there is, with my solder annulus, little or no liability of the solder annulus flowing through and coming in contact with the contents of the can.

My solder annulus is particularly adapted for soldering caps upon sheet-metal cans. It may, however, be employed in soldering heads upon cans, especially filled cans. Owing to the thinness of the solder annulus and its consequent liability to bend out of shape, especially when it is not given a bevel, V, or other grooved form, it is of course more difficult to preserve its shape in handling and applying it where the annulus is of large diameter.

The fact that it is in the form of a ring, however, especially when the ring is beveled or made of a V shape, greatly adds to its rigidity, and stiffens and renders it easy to handle the solder rings when made of any suitable diameter.

I am aware of and hereby disclaim the solder-wire loop or ring having jointed disconnected ends, as shown and described in the patent to Lang, No. 112,054, of February 21, 1871. Such jointed or incomplete solder-wire rings cannot be made to preserve their circular shape in handling, and are of little or no practical utility, because when made of sufficient diameter to be strong enough to retain their shape they contain vastly too much solder for soldering the seam or for being quickly melted by the heat. For these reasons, in practice, the Lang solder is now and has been heretofore made and sold in the form of short segments of wire about one-eighth of an inch in diameter, the segment being usually less than one-quarter of a circumference in length.

My solder rings, being continuous or seamless rings, and being thin and flat, are thus made sufficiently strong and rigid to perfectly preserve their circular form, while at the same time they contain only just the required amount of solder to solder the seam.

I claim—

1. The continuous annulus or ring of solder conforming to the outline of the seam to be soldered, substantially as specified.

2. The thin sheet-solder annulus or ring conforming to the outline of the seam to be soldered, and of a bevel shape corresponding to the seat of the can cap or head to be soldered, substantially as specified.

3. The thin sheet-solder annulus or ring of a double bevel or V shape, substantially as specified.

EDWIN NORTON.

Witnesses:
  H. M. MUNDAY,
  LEW. E. CURTIS.